C. ELLIS.
CEMENT BURNING APPARATUS.
APPLICATION FILED JAN. 25, 1912.
1,116,044.
Patented Nov. 3, 1914.
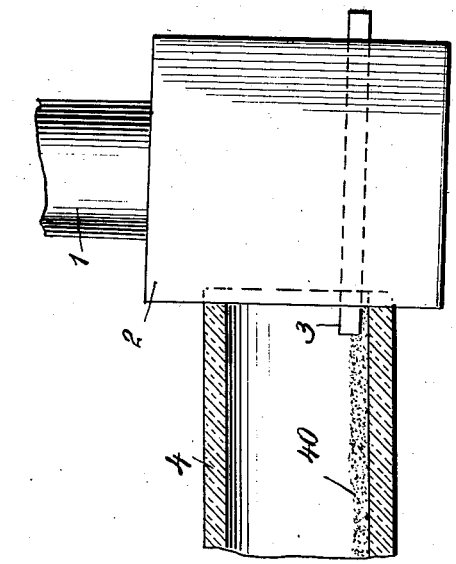
Fig. 1.
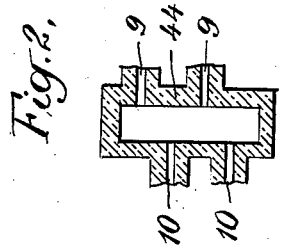
Fig. 2.
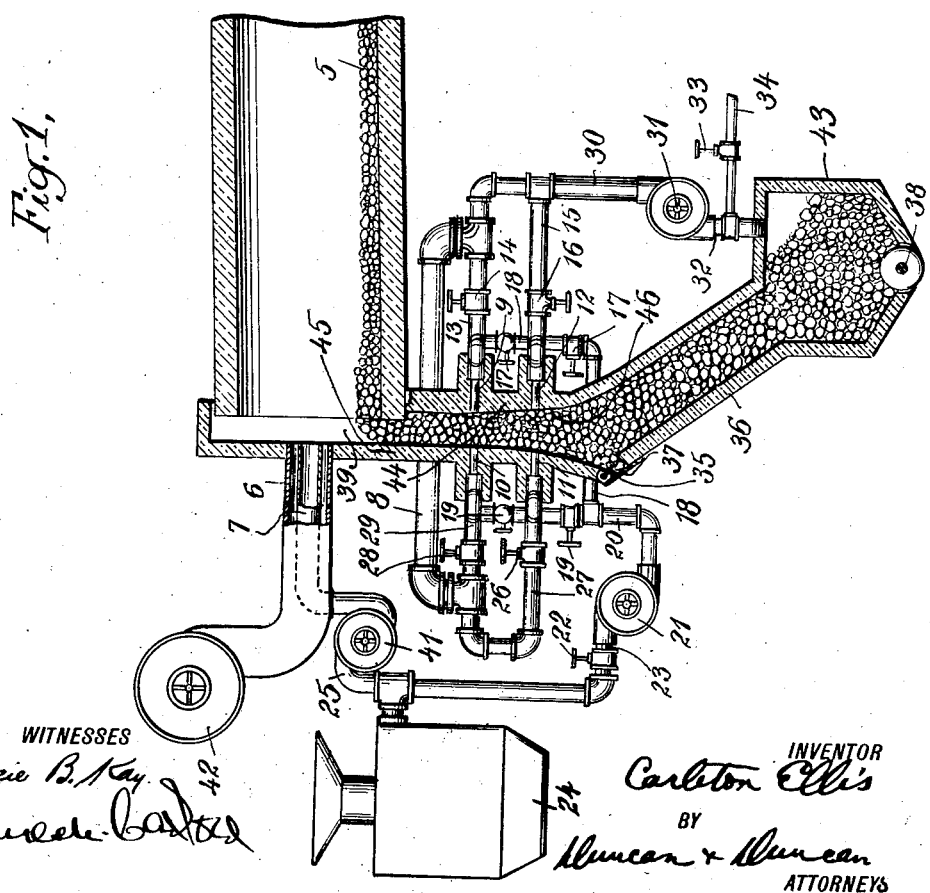
WITNESSES
Jessie B. Kay
INVENTOR
Carleton Ellis
BY
Duncan & Duncan
ATTORNEYS

UNITED STATES PATENT OFFICE.

CARLETON ELLIS, OF MONTCLAIR, NEW JERSEY.

CEMENT-BURNING APPARATUS.

1,116,044. Specification of Letters Patent. Patented Nov. 3, 1914.

Application filed January 25, 1912. Serial No. 673,417.

*To all whom it may concern:*

Be it known that I, CARLETON ELLIS, a citizen of the United States, and resident of Montclair, county of Essex, State of New Jersey, have made certain new and useful Inventions Relating to Cement-Burning Apparatus, of which the following is a specification, taken in connection with the accompanying drawing, which forms part of the same.

This invention relates especially to apparatus for burning Portland cement or other material by first calcining the fine raw material and balling it up into the form of suitable granules and then clinkering or superheating this granulated material by means of heat developed by the so-called surface combustion of an explosive gaseous mixture.

A full understanding of the invention can best be given by a detailed description of a complete apparatus embodying the various features of the invention in a preferred form, and such a description will now be given in connection with the accompanying drawings showing such an apparatus, and in which:—

Figure 1 is a vertical section; and Fig. 2 is a detailed horizontal section of the clinkering furnace.

In the illustrative form of apparatus shown somewhat diagrammatically in the drawings, the preliminary treating of calcining furnace may be in the form of a rotary kiln 4 of usual construction coöperating with the stack chamber 2 and stack 1 and having such inclination that the finely pulverized raw Portland cement mixture 40 or other suitable material is gradually fed down through the kiln. The kiln may be heated in any desirable way, as for instance, by a suitable burner tube coöperating with the kiln hood 39 of ordinary construction and this burner tube, such as 7, may supply producer gas to the kiln to form a flame therein by connecting the burner tube with a suitable producer 24 and pipe 25 in which the fan or blower 41 may be located. The burner casing 6 may be located in connection with the burner tube 7 as by concentrically surrounding the same and may supply an annular envelop of air around the fuel gas stream by connecting the burner casing with a suitable air fan 42. In this way a substantially centralized luminous flame of producer gas which may be carbureted to the desired extent if preferred extends a considerable distance up the kiln and serves to gradually heat and calcine the fine raw material 40 so as to effect its aggregation or balling up into the form of coherent balls or granules 5 which are fed down through the lower end of the kiln as diagrammatically indicated.

The discharge end of the kiln or preliminary heating furnace may coöperate in any desired way with a suitable clinkering or superheating furnace of the surface combustion type. For instance, the clinkering furnace 44 may be directly connected with the kiln hood through the substantially vertical feed chute 45, this superheating furnace preferably having a downwardly flaring body 46 to promote the feed of the granular material therethrough and minimize clogging. Any desired number of suitable injecting passages 9, 10, 11, 12 may communicate with this furnace body at various parts of the same, the various passages in each tier being preferably laterally displaced as shown in Fig. 2 to promote equalized heating of the material. Any suitable explosive gaseous mixture may be injected through one or more such injecting passages into the hot granular material within the superheating furnace so as to effect the highly accelerated surface combustion of the explosive gases within the granular material. The combustible gas for such work may be conveniently supplied from one or more producers 24 to the connected pipe 23 which may have the regulating valve 22, the connected gas blower 21 serving to force this combustible gas through the gas supply pipe 20 in amounts desired. The blowers 21 and 41 may be of special type provided with large clearance and explosion doors or if desired the gas pressure can be secured by blowers beyond the producer operating it at the desired high pressure which makes it unnecessary to pass the hot producer gas through any blowing device. Suitable valves 19 serve to control the supply of this combustible gas to the injecting passages 10, 11 and similar regulating valves 17 in the branch 18 of this gas supply control in a similar way the gas supplied to the injecting passages 9, 12.

The requisite amount of air for incorporation with the combustible gas to form the desired explosive gaseous mixture preferably containing a slight excess of air beyond that required for the complete combustion of the combustible gas for high temperature work, may be supplied through the air pump or blower 31 communicating with the air supply pipe 30 so as to supply through the pipe 15, for instance, the requisite amount of air as determined by the air valve 16 to mix with the gas for the injecting passage 12 and form the desired explosive gaseous mixture injected therethrough. A similar air pipe 13 and valve 14 control the supply to the injecting passage 9, and the air main 8 and valve 28 regulate the amount of air supplied through the pipe 29 to mix with the gas for the injecting passage 10, the valve 26 in the pipe 27 having a similar function in connection with the injecting passage 11. In this way the desired number of jets of explosive gases are injected at various points preferably at speeds in excess of the normal speed of backfiring of the explosive mixture into the heated granular material in the clinkering or superheated furnace so as to intensely heat the same by the accelerated and substantially flameless surface combustion occurring therein. The granules of Portland cement material or other material treated in the furnace are thus heated within and adjacent the intense combustion zones produced near the injecting passages, it being of course, understood that the hot combustion gases pass up through the granular material in the superheating furnace so as to heat the same before these hot gases pass into the preliminary treating furnace to supply some additional heat to the material therein. Portland cement may be effectively burned in this way since producer gas gives under ordinary rotary kiln conditions ample heat for the substantially complete calcination of the Portland cement material which can thus be supplied to the clinkering furnace in the form of granules or balls an inch or so in diameter after substantially all or a large part of the carbon-dioxid has been driven off. The clinkering or semi-vitrification of the cement material can then be effected with the expenditure of comparatively little heat energy if the hot cement material can be raised to the high clinkering temperature. The high temperature required for clinkering can be conveniently and efficiently secured by the surface combustion of any suitable explosive gases within the granular cement material itself so as to bring it up to the clinkering temperature quickly and economically and effect the clinkering or semi-vitrification of the completely calcined lime, silica and other components, which reaction seems to be of an exothermic character. The highly accelerated character of the surface combustion obtainable makes it possible to secure in this way the desired clinkering temperature even with the relatively low calorific intensity of ordinary producer gas, although of course carbureted producer gas or other combustible gas or vapor may be used in the superheating furnace. The body or passage 46 of the clinkering furnace is preferably downwardly flaring in each direction so as to minimize clogging or sticking of the clinkered granules of Portland cement or other material and if desired one or more poke holes, such as 35, may be provided and normally covered with suitable doors, such as 37, so as to allow bars or other instruments to loosen any masses of material from the furnace body and promote the feed of material therethrough. The superheating furnace is preferably connected with a suitable discharge chute 36 which may communicate with a substantially closed receiver or chamber 43 from which the material may be removed in any desired way as by the conveyer 38 of any description. Air may of course be admitted to the receiver at various points as through the conveyer opening therein and this air may be withdrawn from the receiver by the air blower 31 and its connected pipe 32 which in this way allows the air to be preheated to the desired extent by passage through the hot material in the receiver. Additional quantities of outside air may if desired be admitted to the air blower through the admission pipe 34 in which the control valve 33 may be located.

The fine raw material is preferably fed substantially uniformly to the preliminary or calcining furnace and the rotation of this furnace serves to feed the material therethrough in a practically uniform manner and to constantly discharge the granules of calcined or otherwise treated material from the lower end of the furnace into the feed chute 45 of the clinkering or superheating furnace 44. The granular material may be gradually fed down through this superheating furnace in the form of a traveling stream by removing the completely treated material from the receiver 43 in a substantially uniform manner so as to allow the gradual feed of material through the discharge or receiver chute 36 and the connected flaring furnace body 46. As the treated granular material may be discharged from the preliminary furnace at a high red heat the injection of the explosive gaseous mixtures into the same from the injecting passages is sufficient to at once initiate surface combustion of the gaseous material therein and the feed of the material through this superheating furnace is of course regulated so as to secure the desired high temperature and treatment of the material within or adjacent the injecting passages. In the treatment of other fine material, such for example, fine iron ore, blast furnace flue dust or blue billy the fine material fed into the rotary kiln is calcined and desulfurized to the desired extent in the oxidizing atmosphere and in the hot zone of the kiln is sufficiently balled up to form granules which are supplied to the superheating furnace, a suitable small proportion of flux being if desired incorporated with the fine ore fed to the rotary kiln. In the superheating furnace the surface combustion of the explosive gases preferably of a suitable reducing character serves to consolidate the granules so as to make them suitable for blast furnace work, and if desired a considerable reducing action may occur in this furnace resulting in the production of a corresponding proportion of spongy iron in the granules. It is of course understood that the feed of such material through the superheating furnace must be promoted to the desired extent by suitable means and undesirable agglomeration of the material or its sticking to the furnace walls prevented.

Having described this invention in connection with an illustrative embodiment, to the details of which disclosure the invention is not of course to be limited, what is claimed as new and what is desired to be secured by Letters Patent is set forth in the appended claims.

1. In apparatus for burning Portland cement, a rotary calcining kiln, burner devices comprising a burner tube connected with a gas producer to produce a heating flame in said kiln and calcine and ball up the fine Portland cement material fed thereto, a substantially vertical clinkering furnace receiving the hot granular calcined cement material from said kiln, said furnace having a flaring body provided with a plurality of tiers of spaced injecting passages, a receiver chute and receiver connected with said clinkering furnace to receive the granular clinkered material therefrom, there being a poke hole in said clinkering furnace or connections to promote regularity of feed therethrough, means to take from said receiver air heated by contact with the hot material therein and to force said air into said injecting passages, means to take combustible gas from said producer and force the same through said injecting passages after forming an explosive gaseous mixture with the air supplied thereto to effect the accelerated surface combustion of said explosive gaseous mixture within the hot granular material fed through said clinkering furnace to clinker said material.

2. In apparatus for burning Portland cement, a rotary calcining kiln, burner devices to produce a heating flame in said kiln and calcine and ball up the fine Portland cement material fed thereto, a clinkering furnace receiving the hot granular calcined cement material from said kiln, said furnace having a flaring body provided with spaced injecting passages, a receiver chute and receiver connected with said clinkering furnace to receive the granular clinkered material therefrom, there being a poke hole in said clinkering furnace or connections to promote regularity of feed therethrough, means to force air into said injecting passages, means to take combustible gas from a gas producer and force the same through said injecting passages after forming an explosive gaseous mixture with the air supplied thereto to effect the accelerated surface combustion of said explosive gaseous mixture within the hot granular material fed through said clinkering furnace to clinker said material.

3. In apparatus for burning Portland cement, a rotary calcining kiln, burner devices to produce a heating flame in said kiln and calcine and ball up the fine Portland cement material fed thereto, a clinkering furnace receiving the hot granular calcined cement material from said kiln, said furnace having a flaring body provided with spaced injecting passages, means to force air into said injecting passages, means to take combustible gas and force the same through said injecting passages after forming an explosive gaseous mixture with the air supplied thereto to effect the accelerated surface combustion of said explosive gaseous mixture within the hot granular material fed through said clinkering furnace to clinker said material.

4. In apparatus for burning cement, a calcining kiln, devices to calcine and ball up the fine cement material fed thereto, a clinkering furnace receiving the hot granular calcined cement material from said kiln, said furnace being provided with a plurality of injecting passages, means to force air into said injecting passages, means to force combustible gas through said injecting passages and form an explosive gaseous mixture with the air supplied thereto to effect the accelerated surface combustion of said explosive gaseous mixture within the hot granular material fed through said clinkering furnace to clinker said material.

5. In apparatus for burning cement or other material, a preliminary furnace, means to heat said preliminary furnace by producer gas, means to feed fine material through said preliminary furnace to heat and ball up the same, a substantially vertical superheating furnace to receive the granular hot material from said preliminary furnace, said superheating furnace having a downwardly flaring body provided with a series of spaced injecting passages and means to form an explosive mixture of combustible producer gas and air and inject the same at speeds greater than the normal speed of backfiring through said injecting passages to effect surface combustion within the hot granular material in said superheating furnace to superheat said material.

6. In apparatus for burning cement or other material, a preliminary furnace, means to heat said preliminary furnace, means to feed fine material through said preliminary furnace to heat and ball up the same, a superheating furnace to receive the granular hot material from said preliminary furnace, said superheating furnace having a downwardly flaring body provided with a series of injecting passages and means to form an explosive mixture of combustible gas and air and inject the same through said injecting passages to effect surface combustion within the hot granular material in said superheating furnace to superheat said material.

7. In apparatus for burning cement or other material, a preliminary furnace, means to heat said preliminary furnace, means to feed fine material through said preliminary furnace to heat and ball up the same, a substantially vertical superheating furnace to receive the granular hot material from said preliminary furnace, said superheating furnace having a downwardly flaring body and means to form an explosive mixture of combustible gas and air and to effect substantially flameless surface combustion thereof within the hot granular material in said superheating furnace to superheat said material.

8. In apparatus for burning cement or other material, a preliminary furnace, means to heat said preliminary furnace, means to feed material through said preliminary furnace to heat and ball up the same, a substantially vertical superheating furnace to receive the granular hot material from said preliminary furnace and means to form an explosive mixture of combustible gas and air and to effect surface combustion thereof within the hot granular material in said superheating furnace to superheat said material.

CARLETON ELLIS.

Witnesses:
HARRY L. DUNCAN,
JESSIE B. KAY.